United States Patent
Thorpe

(10) Patent No.: US 6,953,597 B2
(45) Date of Patent: Oct. 11, 2005

(54) BATTER COATING FOR POTATO PIECES

(75) Inventor: Alan Thorpe, St. Eleanor's (CA)

(73) Assignee: Irving Pulp and Paper, Ltd., New Brunswick (CA)

( * ) Notice: Subject to any disclaimer, the term of this patent is extended or adjusted under 35 U.S.C. 154(b) by 265 days.

(21) Appl. No.: 10/209,057

(22) Filed: Jul. 31, 2002

(65) Prior Publication Data

US 2004/0022900 A1 Feb. 5, 2004

(51) Int. Cl.⁷ .............................................. A21D 10/04
(52) U.S. Cl. ...................... 426/550; 426/552; 426/555
(58) Field of Search ................................ 426/102, 549, 426/550, 552, 555, 637

(56) References Cited

U.S. PATENT DOCUMENTS

| | | | |
|---|---|---|---|
| 3,597,227 A | | 8/1971 | Murray et al. |
| 4,188,410 A | * | 2/1980 | Rispoli et al. .............. 426/296 |
| 4,375,484 A | * | 3/1983 | Lee et al. ................... 426/549 |
| 4,990,343 A | * | 2/1991 | Haarasilta et al. ............ 426/10 |
| 5,059,435 A | | 10/1991 | Sloan et al. |
| 5,141,759 A | | 8/1992 | Sloan et al. |
| 5,302,410 A | | 4/1994 | Calder et al. |
| 5,431,944 A | | 7/1995 | Melvej |
| 5,622,741 A | | 4/1997 | Stubbs et al. |
| 5,707,670 A | | 1/1998 | Mebansho et al. |
| 5,753,286 A | | 5/1998 | Higgins |
| 5,855,945 A | | 1/1999 | Laughlin et al. |
| 5,885,617 A | | 3/1999 | Jordan |
| 5,885,639 A | | 3/1999 | Judkins et al. |
| 6,093,426 A | | 7/2000 | Tai et al. |
| 6,132,785 A | | 10/2000 | Collinge et al. |
| 6,335,041 B1 | * | 1/2002 | Baur et al. .................... 426/94 |

* cited by examiner

*Primary Examiner*—Arthur L. Corbin
(74) *Attorney, Agent, or Firm*—Heslin Rothenberg Farley & Mesiti, P.C.

(57) ABSTRACT

Potato strips are cut at a desirable pre-determined size from raw potatoes and blanched. The blanched strips are covered with a batter slurry comprising, as a percentage of a dry batter used to make the slurry, 97.4 to 99.8% by weight of a batter base selected from a modified food starch batter base and a flour batter base. The batter base comprises a modified food starch of from 10 to 60% by weight of the batter. The modified food starch is acetylated, cross-linked or acetylated and cross-linked. The dry batter further comprises from 0.0 to 1.0% by weight of calcium lactate and from 0.1 to 1.6% by weight of de-oiled lecithin. Such strips are then par-fried and preferably frozen. The frozen strips, once reconstituted, retain their crispness under adverse, e.g. high humidity, conditions such as those encountered under take-out conditions where the strips are placed into a closed container for home delivery or take out.

12 Claims, No Drawings

BATTER COATING FOR POTATO PIECES

This invention relates to a batter coating, to the preparation of potato pieces, such as French fries, using the batter coating, and to potato pieces coated with the batter coating. The potato pieces so prepared have extended crispness holding qualities in high humidity and high temperature situations such as those encountered in restaurant take-out applications, e.g. where French fries are portioned in closed boxes to be taken home prior to serving and consumption.

BACKGROUND OF THE INVENTION

Retention of crispness of French fries is of great concern for take-out food operations which package the French fry strips, after finish frying, into various types of packages for transport to consumers' homes. While being transported home, French fries are subjected to conditions of high heat and humidity in the packages. The result is re-hydration of the batter on the surface of each fry and, consequently, an undesirably limp, soggy and tough French fry. Various procedures have been proposed for extending the crispness-holding quality of French fries after finish frying.

U.S. Pat. No. 5,885,639 relates to a procedure for extending the crispness-holding time of French fries through application of a pre-coating containing a hydrocolloid prior to coating the strips with a batter.

U.S. Pat. No. 5,141,759 relates to a procedure whereby potato strips with increased crispness are obtained by coating the strips prior to par-frying with an aqueous slurry containing chemically modified, ungelatinized potato starch, chemically modified, ungelatinized corn starch, and rice flour.

U.S. Pat. No. 3,597,227 relates to coating potato strips, prior to deep frying, with a coating of high amylose starch for the purpose of increasing the crispness of the strips.

U.S. Pat. No. 5,302,410 discloses application of a glaze coating of hydrolysed starch with a DE of less than 12 at pH levels of 5.5–8.5, to increase the crispness of French fry strips.

U.S. Pat. No. 5,431,944 relates to use of a batter mix containing a leavening agent, a blend of starch and high amylose starch, dextrin and a food gum to increase crispness.

U.S. Pat. No. 5,622,741 discloses that strips coated with a slurry of corn flour, corn starch and low solubility dextrin prior to par-frying yields a product which, upon re-frying, exhibits increased crispness.

These prior procedures have met with qualified success in the potato processing industry. All of these procedures appear to address the need for a French fry with improved crispness over an extended period of time. However, they all only address the need for enhanced or extended crispness under conditions found in fast-food and eat-in restaurants, where French fries are either served immediately upon reconstitution, or held under sophisticated holding stations and/or operating procedures until served. None of the patents addresses the loss of crispness of French fries, either coated or uncoated, when they are subjected to the high heat and humidity conditions imposed by take-out restaurant operations. There is, therefore, a need for a means to extend the duration of crispness of take-out fries and other take-out potato products under take-out food conditions.

SUMMARY OF THE INVENTION

The invention provides a novel batter coating for potato pieces, preferably potato strips such as French fries, prior to par-frying of the potato pieces. The batter coating is a slurry comprising a dry batter mixed in water, i.e. a "batter slurry" herein. The dry batter comprises from 97.4% to 99.8% by weight of a modified food starch batter base or flour batter base, wherein the batter base comprises a modified food starch of from 10 to 60%, preferably from 30 to 50% by weight of the dry batter, from 0.1 to 0.7% by weight of de-oiled lecithin and from 0.0 to 1.0% by weight of calcium lactate, preferably from 0.1 to 1.0% of calcium lactate. The modified food starch is acetylated, cross-linked, or acetylated and cross-linked. A "modified food starch batter base" herein is a batter base in which there is more modified food starch than any other constituent. A "flour batter base" herein is a batter base in which there is more flour than any other constituent. Preferably, the flour is a wheat flour. The term "potato pieces" used herein and throughout this application includes potato pieces of various shapes and sizes, preferably potato strips for French fries, and the pieces may be cut or shaped from potatoes.

In another aspect the invention also provides a process for producing either non-frozen refrigerated, or frozen, par-fried potato pieces, preferably par-fried potato strips such as French fries, which, when heated for consumption, have extended crispness in relatively high humidity food storage environments. The process comprises applying the foregoing described batter slurry of the present invention to potato pieces for par-frying to produce battered potato pieces, then par-frying the battered potato pieces to produce par-fried potato pieces, and then freezing, or refrigerating without freezing, the par-fried potato pieces.

In a further aspect the invention provides for par-fried potato pieces, frozen or unfrozen, which are coated with the foregoing described batter slurry of the present invention.

The par-fried potato pieces of the present invention, upon reconstitution, retain a crisp, tender surface texture and mealy interior for extended periods of time in take-out containers. The extended holding ability of this product, i.e. excellent crispness and resistance to re-hydration, is believed to be due to the unique, synergistic combination of the modified food starch and de-oiled lecithin ingredients within the batter formulation which is the subject of the invention.

The batter slurry described herein may be applied at varying thickness to any potato piece, e.g. any cut of French fry, depending upon the desired degree of crispness retention and surface smoothness desired. Thicker batters, i.e. having higher solids content, will retard crispness loss to a higher degree and, therefore, would be preferable for use in more challenging conditions.

It has been found that potato pieces prepared in accordance with the present invention can retain their crispness for periods in excess of 10 minutes when sealed in impervious containers immediately after finish frying. This performance far outperforms any commercially available existing product, or product described by the patents discussed herein above.

DETAILED DESCRIPTION OF THE INVENTION

The following description relates to specific products, applications and methods in accordance with the present invention and, as such, are exemplary and not limiting of the scope of the invention.

Raw, whole potatoes are typically washed and sorted to remove defective units and, optionally, peeled. Skin-on products are prepared by by-passing the peeling step. The whole potatoes may optionally be pre-heated for 20–45 minutes at a temperature in the range of about 120° to 150° F. to aid in cutting the potatoes into strips. The potatoes are cut into the desired shape, e.g. strips, and preferably blanched in hot water to inactivate enzymes, gelatinize the starch in the potato flesh, and leach sugars from the potato pieces. Typically, blanching involves holding the strips under agitated water at a temperature in the range of about 160°–190° F. for a period in the range of about 5–30 minutes.

After blanching, the potato pieces may be optionally dipped into a food preparation solution containing one or more of sodium acid pyrophosphate, dextrose, salt, or colour, as desired. After the dipping step, the strips may be dried, losing about from 8% to 20% of their weight. The drying process aids, but is not essential to obtaining, the extension of holding time and crispness available under the present invention. This is in contrast to known preparations of French fries, where drying is essential to maintenance of the crispness of the fry. If strips are dried under the process of the present invention, they are preferentially dried using hot air in a conventional dryer designed for this purpose. Temperatures of from about 90° to 150° F. and times from about 8 to 28 minutes are typically used.

Subsequent to optional drying, the potato pieces are coated with the batter slurry, made from the dry batter, which batters respectively are the subject of this invention. The desired crispness and holding properties are conveyed to the potato product by a unique combination of modified food starch and de-oiled lecithin used in the batter formulations. Preferably, calcium lactate is added to the batter concerned to control or improve colour resulting from the foregoing combination. A batter in accordance with the present invention is any modified food starch based, or flour based, batter for coating potato pieces for par frying, which includes the essential ingredients of modified food starch and de-oiled lecithin, and optionally the calcium lactate. In either a modified food starch based or flour based dry batter, there is modified food starch in the range of from 10 to 60% of the dry batter, preferably 30 to 50% of the dry batter. The former range is the broadest which appears to work in the subject invention. However, if modified food starch content is between 10 to 30% or between 50 to 60% of the dry batter, the batter slurry exhibits properties of the present invention but not to the degree that is obtained within the preferred range of 30 to 50% of the dry batter. If modified food starch content is below 10% of the dry batter, the batter slurry formed from the dry batter does not perform any better than conventional batters. If modified food starch content is above 60% of the dry batter, end product is undesirably tough and chewy.

One example of a batter, in accordance with the present invention, has the following formulation (expressed in percent-by-weight of the dry batter):

| | |
|---|---|
| Modified Food Starch: | 40–60% |
| Rice flour: | 10–45% |
| Dextrin: | 5–30% |
| Salt: | 0–10% |
| Deoiled lecithin: | 0.1–1.6%, preferably 0.2–1.6% |
| Calcium lactate: | 0.0–1.0%, preferably 0.1–1.0%, most preferably 0.2–1.0% |
| Leavening: | 0–5% |
| Xanthan gum: | 0–0.5% |

The modified food starch may be any modified food starch which is acetylated, cross-linked, or acetylated and cross-linked, although acetylated and cross-linked modified food starches are preferred as they appear to produce a product with the highest degree of crispness and holding enhancement. Most preferred are modified potato starches which are acetylated and cross-linked. Modified food starches which are neither acetylated nor cross-linked are not covered by the present invention.

Any de-oiled lecithin, such as Lecigran™ 5750 from Riceland, may be used in the inventive formulation. The de-oiled lecithin and modified food starch within the inventive formulation work synergistically to provide a short, crisp texture which resists rehydration, while the optional, but preferred calcium lactate acts as a texturizing agent and inhibits darkening of the finished product which would normally accompany the use of the de-oiled lecithin. Where a dark finished product is desired, the calcium lactate may be removed from the formulation, or dextrose added to obtain the desired colour.

The batter slurry coated product obtained through use of the batter formulations of the present invention has a very tender and short crispness, unlike conventional flour or starch based batter coated products which exhibit a harder, more glassy crispness. Flavoured products with the same unique holding ability and crispness properties may be obtained through adding flavour or spice, of up to 10% by weight of the dry batter, to the formulations of the present invention. Texture and appearance adjustments to the formulations of the present invention may be made by adjusting the types and amounts of non-essential ingredients, the essential ingredients being the modified food starch and de-oiled lecithin. The calcium lactate is a much preferred, though not essential, ingredient.

The batter slurries of the present invention may be applied by spraying the batter slurry onto the potato pieces, dipping the potato pieces into the batter slurry, or by allowing the potato pieces to travel on a conveyor through a batter slurry cascade.

Subsequent to application of the batter slurry, the product may be passed under air blowers to remove excess batter, adjust the batter pickup, or affect the crispness or appearance of the product.

The batters of the present invention are applied when in the form of a slurry in water, i.e as a batter slurry. Preferably, when applied to dried French fry strips, such slurry has solids levels in the range of about 20–60% by weight of the slurry, more preferably 30–50% by weight of the slurry, and viscosities in the range of about 200–2000 centipoise, more preferably 300–1800 centipoise, as measured by a Brookfield DVII viscometer utilizing a number 4 spindle and a speed of 20 rpm, depending upon the thickness of the batter desired on the end product.

EXAMPLE 1

A series of tests were performed on potato product coated with examples of batter slurries made in accordance with the present invention, utilizing a modified food starch batter base or a wheat flour batter base. The two examples of the inventive formulations tested were as follows (in % by weight of the dry batter):

(1) Food Starch Based Dry Batter:

| Modified Potato Starch: | 47.60% |
|---|---|
| Rice flour: | 25.0% |
| Dextrin: | 15.0% |
| Salt: | 7.90% |
| De-oiled lecithin: | 0.40% |
| Calcium lactate: | 0.60% |
| Leavening: | 3.30% |
| Xanthan gum: | 0.20% |

(2) Wheat Flour Based Dry Batter:

| Wheat flour: | 36% |
|---|---|
| Modified Potato Starch: | 15% |
| Rice flour: | 22% |
| Dextrin: | 15% |
| Salt: | 10% |
| De-oiled lecithin: | 0.4% |
| Calcium lactate: | 0.6% |
| Leavening: | 0.8% |
| Xanthan gum: | 0.2% |
| Dextrose: | 0.0% |

French fry strips cut at 7/16 inch raw dimensions were processed using the above-noted examples of inventive, as well as comparative non-inventive, modified food starch based and flour based batters as clear coat slurry formulations. Both of the non-inventive formulations had the same formulas as the inventive formulations, except that the former used different starches (the modified food starch based batter used cross-linked KV™ modified food starch of Emsland-Starke GmbH, and the wheat flour based batter used an acetylated starch), did not use de-oiled lecithin and did not use calcium lactate. Both of the non-inventive formulations represented currently available commercial products that are used in some take-out operations. These non-inventive products were compared to batter covered strips prepared using the inventive formulations for achieving increased crispness hold time. Each sample was fried for 3 minutes in a Frymaster™ 40 pound gas fryer. After frying, the fry strips were immediately placed into plastic bags. The product was sealed in the plastic bags and held for 10, 20, 30, 40 and 50 minutes. For this test, the crispness of the batter of the present invention was given a rating of 10 and, a total lack of crispness was given a rating of 0. The results of this test are shown below in Table I:

TABLE I

| Hold Time | Inventive Take-Out Batter Coated Product Rating | Non-inventive Flour Based Clear Coated Product Rating | Non-inventive Starch Based Clear Coated Product Rating |
|---|---|---|---|
| 10 Minutes | 10 | 5 | 8 |
| 20 Minutes | 9.5 | 2 | 7 |
| 30 Minutes | 8.5 | 0 | 4 |
| 40 Minutes | 8 | 0 | 3 |
| 50 Minutes | 7.5 | 0 | 3 |

This test showed a clear preference for the product coated with the inventive batter slurry containing the de-oiled lecithin and modified potato starch. The non-inventive starch based batter slurry and flour based batter slurry used in this study each had the same formula as the inventive take-out batter slurry, but omitted the lecithin and calcium lactate and utilized a different type of modified potato starch.

EXAMPLE 2

In order to determine which ingredients were providing the benefits of increased crispness and of resistance to re-hydration, an additional series of tests was performed. In this series of tests, the methods used in Example 1 were repeated on 0.305" raw cut pieces of potato, but a control, made according to the invention, was evaluated against:

a) the control formula without the lecithin, b) the control formula without the calcium lactate, c) the control formula without calcium lactate and lecithin, and d) the control formula with a different type of modified potato starch, namely KV™ Modified Starch (Emsland-Starke GmbH), which is a chemically modified food starch that is cross-linked, but not acetylated.

The results of this series of tests are shown in Table II, below:

TABLE II

| Time | Control | No Lecithin | No Calcium Lactate | No Lecithin and Calcium Lactate | KV Modified Starch |
|---|---|---|---|---|---|
| 10 Minutes | 10 | 10 | 10 | 8 | 9 |
| 20 Minutes | 9.5 | 7 | 9 | 7.5 | 7 |
| 30 Minutes | 8.5 | 6 | 8 | 6.5 | 7 |
| 40 Minutes | 8 | 6 | 8 | 6.5 | 7 |
| 50 Minutes | 7.5 | 6 | 7 | 5 | 5 |
| 60 Minutes | 7 | 4.5 | 6.5 | 4.5 | 4.5 |

These tests show that the major component contributing to the extended hold time is the lecithin. The trial where both the calcium lactate and lecithin were removed indicates that the calcium lactate has little to do with the extended hold time. The last trial, where the acetylated and cross-linked potato starch was substituted with a KV Modified Potato Starch, shows that there is a synergistic effect between the starch and the de-oiled lecithin, and it is this synergistic effect that results in the increase hold time in adverse conditions.

Experiment 3

In order to simulate actual home delivery, Experiment 1 was largely repeated. The same kinds of products were cooked, but then were held for 5 minutes under a heat lamp before being portioned into paperboard boxes, which were placed into paper bags and allowed to sit for a period of 10 minutes at room temperature. At the end of the 10 minute hold, the products were evaluated. The results of the evaluation are shown below in Table III. The batter containing the lecithin and acetylated and cross linked starch is listed in Table III as "Special Formulation."

TABLE III

| Formulation | Crispness Immediately After Frying | Crispness After 10 Minutes Hold in Closed Boxes | Comments |
|---|---|---|---|
| Starch Based Clear Coat Slurry | 10 | 8 | Fair crispness, but chewy |
| Wheat Flour Based Clear Coat Slurry | 10 | 6 | Some crispness left, but product is chewy |
| Special Formulation | 10 | 9 | Very crisp exterior texture, no chewiness |

As shown in these tests, batter slurries containing de-oiled lecithin in combination with an acetylated and cross-linked starch best enhanced the holding ability of battered fries when the fries were held at conditions of high humidity and temperature such as are found in take out operations.

While the present invention has been described by reference to specific embodiments, it will be apparent to those skilled in the art that other alternative embodiments or modifications may be employed without departing from the scope of this invention.

What is claimed is:

1. A dry batter for use in preparing a batter slurry for coating potato pieces prior to par-frying of the potato pieces, which dry batter comprises:
   97.4 to 99.8% by weight of a batter base selected from the group consisting of a modified food starch batter base and a flour batter base, wherein said batter base comprises a modified food starch of from 10 to 60% by weight of the dry batter, and wherein said modified food starch is acetylated or cross-linked, or acetylated and cross-linked;
   0.0 to 1.0% by weight of calcium lactate; and
   0.1 to 1.6% by weight of de-oiled lecithin.

2. The dry batter, as defined in claim 1, wherein the dry batter comprises from 0.1 to 1.0% by weight of calcium lactate.

3. The dry batter, as defined in claim 2, wherein the modified food starch is a modified potato starch.

4. The dry batter, as defined in claim 2, wherein the dry batter further comprises, as a percent-by-weight of the dry batter, the following:

| | |
|---|---|
| modified food starch: | 40–60% |
| rice flour: | 10–45% |
| dextrin: | 5–30% |
| salt: | 0–10% |
| de-oiled lecithin: | 0.1–1.6% |
| calcium lactate: | 0.1–1.0% |
| leavening: | 0–5% |
| xanthan gum: | 0–0.50%. |

5. The dry batter, as defined in claim 2, wherein the dry batter comprises, in percent-by-weight of the dry batter, the following:

| | |
|---|---|
| wheat flour | 10–60% |
| modified food starch | 10–60% |
| rice flour | 10–45% |
| dextrin | 5–30% |
| salt | 0–10% |
| de-oiled lecithin | 0.1–1.6% |
| leavening | 0–5% |
| xanthan gum | 0–0.50%. |

6. A batter slurry for coating potato pieces prior to par-frying of the potato pieces, said batter slurry comprising a mixture of dry batter in water, said dry batter comprising, as a percentage by weight of said dry batter:
   97.4 to 99.8% by weight of a batter base selected from the group consisting of a modified food starch batter base and a flour batter base, wherein said batter base comprises a modified food starch of from 10 to 60% by weight of the dry batter, and wherein said modified food starch is acetylated or cross-linked, or acetylated and cross-linked;
   0.0 to 1.0% by weight of calcium lactate; and
   0.1 to 1.6% by weight of de-oiled lecithin.

7. The batter slurry, as defined in claim 6, wherein said calcium lactate is from 0.1 to 1.0% by weight of said dry batter.

8. The batter slurry, as defined in claim 7, wherein the modified food starch is a modified potato starch.

9. The batter slurry, as defined in claim 6, wherein said dry batter further comprises, as a percent-by-weight of the dry batter, the following:

| | |
|---|---|
| modified food starch: | 40–60% |
| rice flour: | 10–45% |
| dextrin: | 5–30% |
| salt: | 0–10% |
| de-oiled lecithin: | 0.1–1.6% |
| calcium lactate: | 0.1–1.0% |
| leavening: | 0–5% |
| xanthan gum: | 0–0.50%. |

10. The batter slurry, as defined in claim 6, wherein said dry batter comprises, as a percent-by-weight of the dry batter, the following:

| | |
|---|---|
| wheat flour | 10–60% |
| modified food starch | 10–60% |
| rice flour | 10–45% |
| dextrin | 5–30% |
| salt | 0–10% |
| calcium lactate | 0.1–1.0% |
| leavening | 0–5% |
| xanthan gum | 0–0.50%. |

11. The batter slurry, as defined in claim 6, wherein said batter slurry has a solids content of about 20–60% by weight and a viscosity in the range of about 200–2000 centipoise when measured on a Brookfield DVII Viscometer at 20 rpm.

12. The batter slurry, as defined in claim 11, wherein the solids content is about 30–50%.

* * * * *

UNITED STATES PATENT AND TRADEMARK OFFICE
CERTIFICATE OF CORRECTION

PATENT NO.     : 6,953,597 B2  
DATED          : October 11, 2005  
INVENTOR(S)    : Thorpe It is certified that error appears in the above-identified patent and that said Letters Patent is hereby corrected as shown below:

Column 7,  
Lines 57-65, Table, delete "calcium lactate: 0.1-1.0%".

Column 8,  
Line 2, insert -- further -- after "batter" (first occurrence).  
Lines 6-13, Table, delete "de-oiled lecithin: 0.1-1.6%".  
Line 47, insert -- further -- after "batter".

Signed and Sealed this

Tenth Day of January, 2006

JON W. DUDAS  
*Director of the United States Patent and Trademark Office*